United States Patent Office 3,476,853
Patented Nov. 4, 1969

3,476,853
SPRAYED OPAQUE BANDAGE COMPOSITION
Bernard Jatul, North Caldwell, and Christopher Costello, Summit, N.J., assignors to Colgate-Palmolive Company, New York, N.Y., a corporation of Delaware
No Drawing. Filed Apr. 13, 1965, Ser. No. 447,870
Int. Cl. A61f 15/00; A61k 27/00
U.S. Cl. 424—45      1 Claim

ABSTRACT OF THE DISCLOSURE

A sprayable composition for use as a dressing including a film-forming material, an opacifying material, at least one medicament, a solvent and a gaseous propellant.

---

The present invention relates to the application to the skin by spraying of an opacifying agent in a solution of at least one film-forming polymer, at least one plasticizer and a propellant or mixture of propellants. For the treatment of such topical injuries as bruises, abrasions, minor cuts, nonpoisonous insect bites, plant dermatitis and minor burns, it is preferred to incorporate in the aforedescribed fluid dressing at least one therapeutic agent such as a local anesthetic, an antiseptic, an ischemic agent, and an agent to promote epithelization. Presently it is preferred to apply the fluid dressing or bandage by spraying the fluid dressing comprising an opacifying agent, a film-forming polymer, a plasticizer, and one or more therapeutic agents from a closed pressure-resistant container by the expansion of normally gaseous propellant in liquid state. The therapeutic agent or agents incorporated in the film-forming vehicle is, or are, correlated with the use to which the fluid dressing or bandage is to be applied.

The present invention provides a means of applying a protective opaque film which is immediately dry to the touch when applied from a distance of four (4) to six (6) inches, which is water-resistant yet conveniently removable by moderate rubbing under water, is non-stinging, does not interfere with water diffusion from the skin, does not interfere with the normal healing process, and does not interfere with skin respiration. The present invention provides a simulated bandage which is flexible, opaque, porous, protective and adhering to the skin.

Upon application to abrasions so induced in the skin of rabbits as to cause seepage of blood, it was shown to staunch bleeding promptly and to afford a protective film. In wound strength studies on rats, it does not appear to alter the normal healing process. By radioactive techniques, it has been shown, in human in vivo studies, that the protective film of the present invention does not alter normal water diffusion from the skin. It does not alter skin respiration in the mouse and guinea pig. The diffusion of antiseptic agents from the dressing was shown by bacteriological tests and diffusion of local anesthetic was shown by pharmacological tests. Thus, the present invention provides a bandage or dressing which satisfies all of the requirements of the conventional bandage or dressing but which can be applied expeditiously.

The present novel immediately drying opaque sprayable bandage or dressing comprises an antiseptic moiety, an opacifying ingredient or ingredients, one or more local anesthetics, a vasoconstrictor employed as an ischemic agent, at least one film-forming polymeric component, at least one plasticizer, at least one opacifying agent, solvents and propellants. An antihistamine can also be employed as an antipruritic and antiallergic agent. Illustrative of the members of each of the aforementioned classes of constituents of the novel bandage or dressing of the present invention are the following:

ANTISEPTICS

Sodium ethylmercurithiosalicylic acid (Thimerosal); octyl cresoxy ethoxy ethyl dimethyl benzyl ammonium chloride (Hyamine 10X); N-(trichloromethylthio)-4-cyclohexene-1,2-dicarboximide (Vancide 89 RE); a mixture of 5,4'-dibromosalicylanilide and 3,5,4'-tribromosalicylamilide (Diaphene); phenylethyl alcohol; sodium dehydroacetate; butyl parahydroxybenzoate (Butyl paraben); benzyl parahydroxybenzoate (Benzyl paraben); 2,2'-thiobis(4,6-dichlorophenol) or bithionol; trichlorocarbanilide or 3,4,4'-trichlorocarbanilide; a mixture of polybrominated salicylanilides available from "Fine Organics Inc., Lodi, N.J." as "Temosept"; methyl thiram, i.e., tetramethylthiuram disulfide; chlorobutanol; a mixture of alkyldimethylbenzylammonium chlorides of the general formula $C_6H_5CH_2N(CH_3)_2RCl$ in which R represents a mixture of alkyl groups having eight to eighteen (inclusive) carbon atoms, i.e., $C_8H_{17}$ to $C_{18}H_{37}$ and presently available as Zephiran Chloride; and benzyl alcohol.

LOCAL ANESTHETICS

4-[3-(p-butoxyphenoxy)propyl]morpholine hydrochloride (Pramoxine HCl); ethylaminobenzoate; and butylaminobenzoate.

VASOCONSTRICTORS (EMPLOYED AS ISCHEMIC AGENTS)

Methyl benzethonium chloride, Sodium ethylmercurithiosalicylic acid (Thimerosal), 2-aminoheptane carbonate, and phenylephrine HCl.

ANTIBACTERIAL AGENTS

Neomycin; tryothricin; and gramicidin.

OPACIFYING AGENTS

A starch derivative which is a free flowing ungelatinized starch derivative comprising the product of an ungelatinized starch acid-ester of a substituted dicarboxylic acid of the following formula

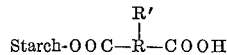

wherein R is a radical from the group diethylene and trimethylene radicals and R' is a hydrocarbon substituent from the class consisting of an alkyl, alkenyl, aralkyl, and aralkenyl reacted with a compound containing a polyvalent metal ion and available under the trade name "Dry-Flo" starch from National Starch Products, Inc., calamine, micronized cellulose, titanium dioxide, magnesium stearate, stearic acid, zinc oxide and silica.

FILM-FORMING POLYMERIC COMPONENTS

Ethyl cellulose, polyvinyl pyrrolidone, polyvinyl alcohol, polyvinyl alcohol-polyvinyl pyrrolidone copoymer, carboxylated copolymer of vinyl acetate, isobutylmethacrylate, polyvinyl acetate, and carboxymethyl cellulose; Dicrylan 405 and 394 available from Ciba Company, New York, N.Y., and said to be acrylic copolymers such as described in U.S. Patents Nos. 2,897,172 and 3,025,219.

PLASTICIZERS

Oleyl alcohol, polyoxyethylene sorbitan monolaurate (Tween 20); a composition of matter available from Malmstrom Chemical Corporation under the trade name of "Lantrol," being described in U.S. Patent No. 2,758,-125 and said to be a mixture of unaltered oil-soluble esters separated from the higher waxy ester of lanolin by a solvent crystallization process; hydrogenated castor oil (Castorwax); isopropyl myristate, cetyl alcohol, and camphor.

SOLVENTS

Methanol, dichloromethane, trichloromonofluoromethane, dichlorodifluoromethane.

ANTIPRURITIC AND ANTIALLERGIC AGENTS
Antihistamine, e.g., methapyriline fumarate.

PROPELLANTS

Fluorochlorohydrocarbons such as "Freon" and vinyl chloride.

The concept of eliminating textile bandages is several years old as is evident from the disclosure of U.S. Patent No. 2,801,201 in which a composition for the treatment of burns adapted to be dispensed from pressure packaged dispensers is described. In U.S. Patent No. 2,804,073 a fluid surgical dressing and, more particularly, a transparent releasably adhesive dressing to be applied as a liquid or spray is disclosed. A self-propelling medicinal ointment comprising mineral oil containing dispersed polyethylene resin and a volatile propellant is described in U.S. Patent No. 3,079,299. However, none of the fluid dressings or sprayable bandages combined in one formulation all of the required characteristics that are found in the sprayable dressing of the present invention.

Illustrative of a satisfactory sprayable dressing which is immediately dry to the touch when applied from a distance of about four (4) to about six (6) inches is the following formulation:

|  | Ingredient | Percent by Weight | |
|---|---|---|---|
|  |  | Broad | Specific |
| Ingred. No.: |  |  |  |
| 1 | Sodium ethylmercurithiosalicylic acid | 0.01–0.1 | 0.01 |
| 2 | Ethylaminobenzoate |  | 1.00 |
| 3 | Ethyl cellulose + | 0.53–1.6 | 1.00 |
| 4 | Silica 0.02 micron * | 0.02–0.08 | 0.04 |
| 5 | Camphor |  | 0.16 |
| 6 | Methanol |  | 2.13 |
| 7 | Dichloromethane | 6.7–10.0 | 10.00 |
| 8 | Polyoxyethylene sorbitan monolaurate | 0.1–1.0 | 0.20 |
| 9 | "Dri-Flo" Starch ** | 2.67–8.0 | 8.00 |
| 10 | D and C Red #18 ++ |  | 0.0013 |
| 11 | D and C Yellow #11 ++ |  | 0.002 |
| 12 | D and C Green #6 ++ |  | 0.0003 |
| 13 | Trichloromonofluoromethane | 40–60 | 38.7282 |
| 14 | Dichlorodifluoromethane | 60–40 | 38.7282 |

+ Hercules N50.
++ Compatible colors.
* Cab-O-Sil M5.
** See opacifying agents, supra.

The sprayable dressing was prepared by milling ingredient 4 into a portion of 7. Ingredients 1, 2, 5, 8, 10, 11 and 12 were dissolved in a mixture of the balance of 7 and 6. The suspension of 4 was then blended into the aforesaid solution. To this mixture the trichloromonofluoromethane (ingredient 13) was added. Ingredients 3 and 9 are then added to the mixture in an aerosol container and the container sealed with a valve. The container is shaken to dissolve 3 and suspend 9. The dichlorodifluoromethane was then added through the valve and the contents of the aerosol container shaken.

What is claimed is:

1. A pressurized composition in an aerosol container and adapted to form a spray upon the release of pressure therefrom which spray forms a protective opaque film which is immediately dry to the touch when applied to an injured surface of living tissue from a distance of 4 to 6 inches comprising up to about 0.1 percent sodium ethylmercurithiosalicylic acid, about 1 percent ethyl aminobenzoate, between about 0.53 and 1.6 percent ethyl cellulose, between about 0.02 and 0.08 percent silica having a micron size of about 0.02, about 6.7 to 10 percent dichloromethane, up to about 1 percent polyoxyethylene sorbitan monolaurate, between about 2.7 and 8 percent of a starch derivative comprising the product of an ungelatinized starch acid-ester of a substituted dicarboxylic acid of the following formula

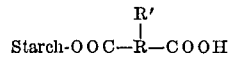

wherein R is a radical from the group diethylene and trimethylene radicals and R' is a hydrocarbon substituent from the class consisting of alkyl, alkenyl, aralkyl, and aralkenyl reacted with a compound containing a polyvalent metal ion, and about 75 percent of a propellant material of 40–60 percent trichloromonofluoromethane and 60–40 percent of dichlorodifluoromethane, all percents being expressed as percents by weight based upon the weight of the final composition.

References Cited

UNITED STATES PATENTS

| 2,481,419 | 9/1949 | Hamilton | 167—84 |
| 2,693,438 | 2/1951 | Ward | 167—84 |
| 2,801,201 | 7/1957 | Kipnis | 167—84 |
| 2,804,073 | 8/1957 | Galbenne | 167—84 |
| 3,073,794 | 1/1963 | Stoner | 167—84 |

OTHER REFERENCES

Washington Post, page 64, Nov. 18, 1952, Cosmetics, Science and Technology.
Sagarin (1957), pp. 231–233.

ALBERT T. MEYERS, Primary Examiner
STANLEY J. FRIEDMAN, Assistant Examiner